United States Patent [19]
Cudmore

[11] 4,089,592
[45] May 16, 1978

[54] MICROSCOPE

[75] Inventor: Patrick J. Cudmore, Duxbury, Mass.

[73] Assignee: Wave-Rider, Incorporated, Duxbury, Mass.

[21] Appl. No.: 656,608

[22] Filed: Feb. 9, 1976

[51] Int. Cl.² .................................................. G02B 27/02
[52] U.S. Cl. ....................................... 350/235; 350/239
[58] Field of Search ................................. 350/235–241, 350/167, 211, 244, 245, 251, 256; 35/20

[56] References Cited

U.S. PATENT DOCUMENTS

| | | | |
|---|---|---|---|
| 198,542 | 12/1877 | Heath | 350/250 |
| 248,219 | 10/1881 | Schissel | 350/239 |
| 846,191 | 3/1907 | Egly | 350/238 |
| 1,089,074 | 3/1914 | Pfeiffer | 350/238 |
| 2,097,850 | 11/1937 | Wallace | 350/211 |
| 3,004,470 | 10/1961 | Ruhle | 350/211 |
| 3,410,635 | 11/1968 | Lockwood | 350/239 |

FOREIGN PATENT DOCUMENTS

871,488  6/1961  United Kingdom ................. 350/235

*Primary Examiner*—John K. Corbin
*Assistant Examiner*—Wm. H. Punter
*Attorney, Agent, or Firm*—Thompson, Birch, Gauthier & Samuels

[57] ABSTRACT

A microscope which has a substantially cylindrical shape, the cylinder being hollow to house insects and the like being viewed, the viewing end of the cylinder including a magnifying lens for viewing the insects, and the walls of the cylinder having Fresnel grooves for increasing the illumination of the insects being viewed.

15 Claims, 3 Drawing Figures

MICROSCOPE

OBJECTS OF THE INVENTION

It is an object of this invention to provide a container or housing in which living insects or other objects are placed for viewing.

It is another object of this invention to provide a container which can be manually opened and closed, and which has means for providing air and water to sustain the living insects being viewed.

It is another object of this invention to provide a container having substantially cylindrical walls having Fresnel grooves for enhancing interior illumination of the container.

It is still another object of this invention to provide an inexpensive, sturdy, plastic device that can be used by a young child as a toy, as well as by an older child or even an adult as an extremely useful instrument for scientific observation of living creatures.

SUMMARY OF THE INVENTION

The microscope of this invention is formed by a hollow tube which has Fresnel grooves on its exterior surface. The Fresnel grooves are circular and are axially spaced-apart. The purpose of the Fresnel grooves is to direct incident external light rays generally towards the viewed end of the hollow tube where living creatures, such as insects, are positioned to be observed.

The viewed end of the hollow tube is closed by a hinged bottom wall. The bottom wall has air vents and an opening in which a moistened sponge is seated. The bottom wall can be manually opened and closed to insert and remove the insects to be viewed.

The viewing end of the hollow tube is closed by a magnifying lens which is focused on a point near the viewed end (where the insects are located). It will thus be seen that the Fresnel grooves cause the insects to be illuminated with additional light, and the magnifying lens permits the brightly lighted insects to be magnified and viewed.

DESCRIPTION OF THE PREFERRED EMBODIMENT

Figure 1:
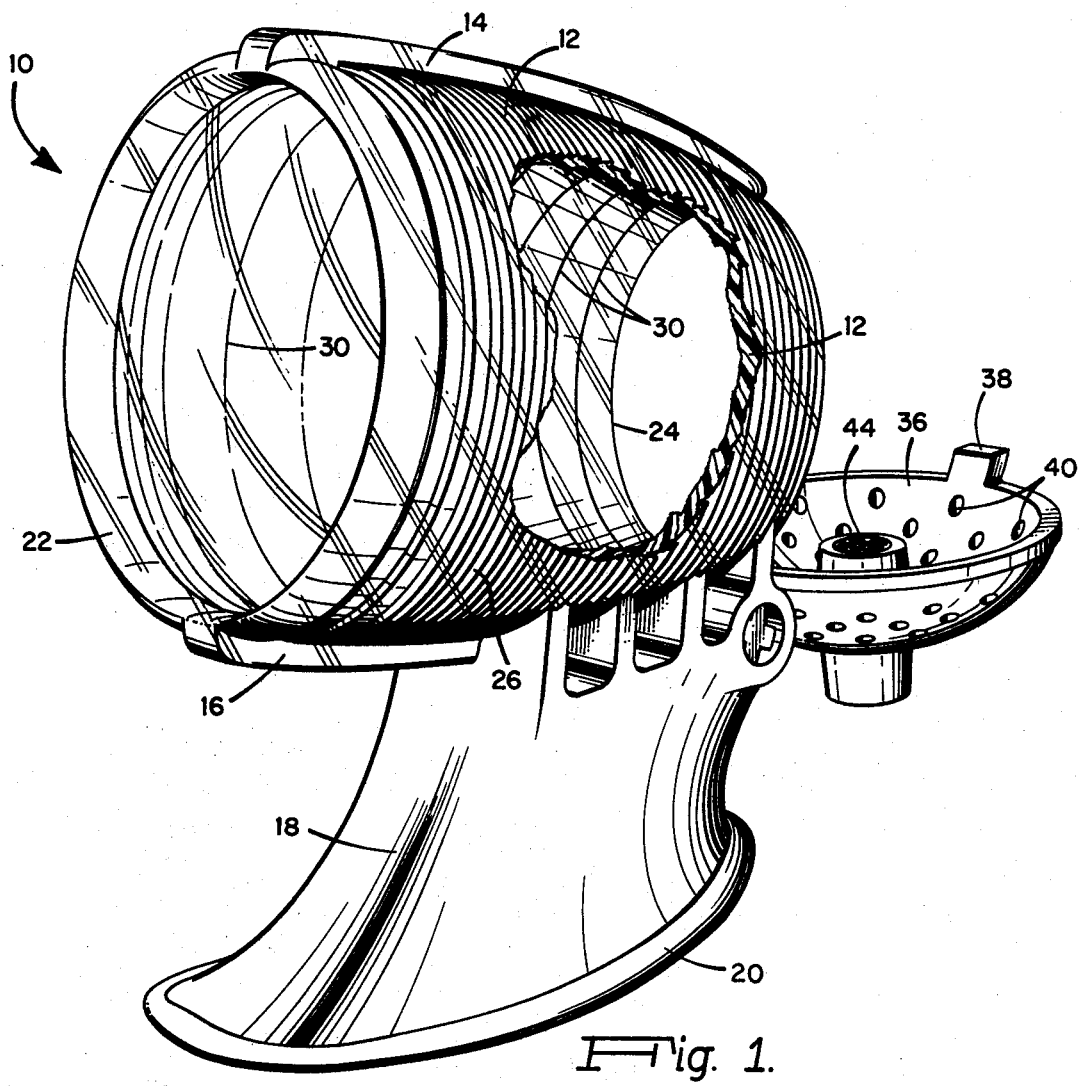
FIG. 1 is a perspective view of the preferred embodiment of the microscope showing the bottom wall pivoted open. A portion of the exteriorly grooved lens wall has been cut away to illustrate the interior wall grooves and the open viewed end.

FIG. 1 illustrates the microscope 10 which constitutes the preferred embodiment of this invention. The microscope has a hollow tubular Fresnel lens wall 12 which is shown to have a decreasing diameter in the viewing direction. It will be understood that the shape of the lens wall 12 could be otherwise in both elevation and cross-section. For example, in elevation, the lens wall could have substantially cylindrical shape or have an hour-glass shape. In cross-section, the shape could be oval, rectangular, octagonal, etc.

Lens wall 12 has upper and lower strengthening flanges 14 and 16 which also facilitate assembly of the microscope during manufacture in a manner which will be described subsequently.

The microscope has a pedestal or stand 18 which has a base 20 adapted to rest on a table or other horizontal surface. Preferably, the lens wall 12 and the pedestal 18 are made of very tough and fracture-resistant transparent plastic which is suitable for injection molding techniques. For example, Lustran styrene molding compound made by Monsanto Chemical Co. has proved satisfactory. If desired, the plastic material could be tinted in a pale pastel color.

Figure 2:
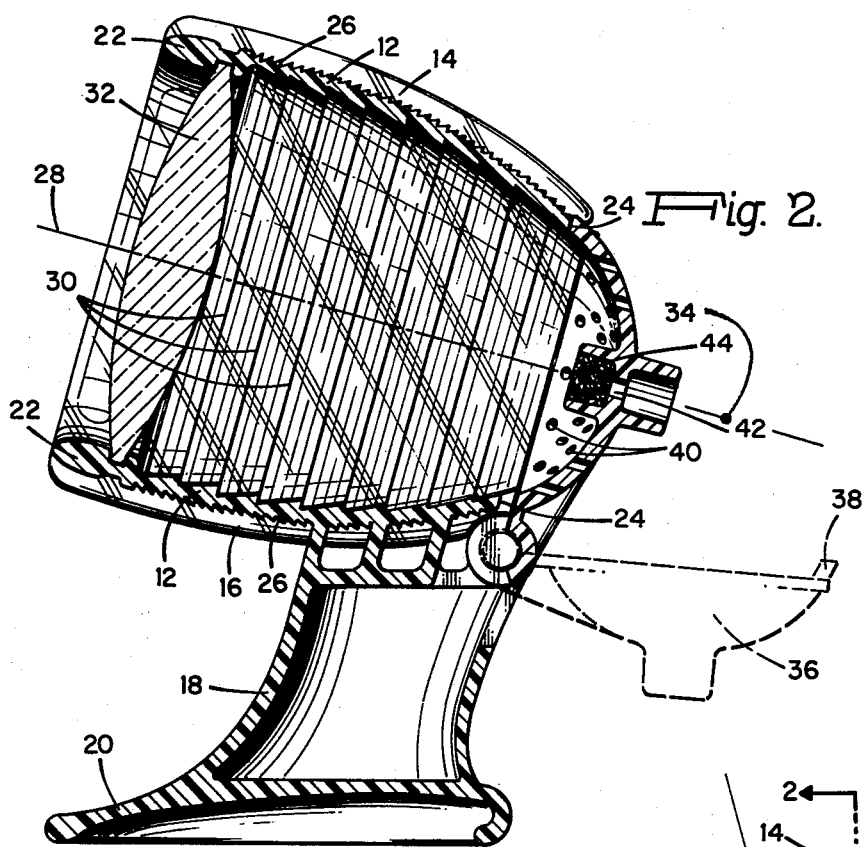
FIG. 2 is a side elevational view taken along line 2—2 of FIG. 3. This figure shows the bottom wall in its closed position and indicates its open position (by dotted lines).

The lens wall and the pedestal are injection molded in two vertically split halves. FIG. 2 approximately shows the left half which includes the integrally formed lens wall and pedestal. The right half is the mirror image of the left half. The upper and lower flanges 14 and 16 are integral with the lens wall and are both split vertically. The flanges serve as the primary facing surfaces which are subsequently glued or welded together in order to complete assembly of the microscope.

The pedestal 18 is shaped so that it can be easily gripped by the user who wants to vary the orientation of the microscope or who wants to otherwise handle the microscope. The pedestal may be transparent or may be frosted, as desired. The lens wall 12 must be left transparent.

The lens wall 12 has an open viewing end which incorporates a protective rim 22. The lens wall has an open viewed end which includes a circular seat 24 having a small notch at its top portion. The exterior surface of the lens wall 12 is grooved in a special manner in order to gather incident exterior light rays, to permit the rays to pass through the wall to the interior wall surface, and to redirect the rays toward the viewed end in other to increase the normal illumination level there.

The special grooves 26 in the exterior surface of lens wall 12 are Fresnel lens grooves, the roots (bottoms) of which are circular, parallel to each other, equally spaced-apart, co-axial and lie in planes which are perpendicular to the lens wall axis 28. The grooves 26 have a saw-toothed shape when viewed in elevation (see the upper portion of FIG. 2). That is, the grooves preferably have a V-shape in which the angle of the groove surface which extends towards the viewing end is disposed at a constant clockwise 80° angle relative to the lens wall axis 28. The angle of the groove surface which extends towards the viewed end is disposed at a varying clockwise 140° to 180° angle relative to axis 28. In other words, the grooves themselves have V-shaped angles which increase from about 60° to 100° as they approach the viewed end. This arrangement has been used with success on a tubular lens wall which tapers from a 2.9 inch diameter at the viewing end to a 1.9 inch diameter at the viewed end, over an axial length of 2.5 inches.

Additionally, the preferred embodiment of the lens wall has special grooves 30 on the interior surface. Like the exterior grooves 26, these grooves have roots which are circular, parallel to each other, equally spaced-apart, co-axial and lie in planes which are perpendicular to the lens wall axis 28. The grooves 30 preferably have an inverted V-shape (see the upper portion of FIG. 2) in which the angle of the groove surface which extends (relatively) towards the viewing end is disposed at a constant clockwise 275° angle relative to the lens wall axis 28. The angle of the groove surface which extends towards the viewed end is disposed at a varying clockwise 195° to 210° angle relative to axis 28. In other words, the grooves themselves have inverted V-shaped angles which decrease from about 80° to 65° as they approach the viewed end. There are approximately four exterior grooves 26 for each interior groove 30. In other words, the interior grooves 30 are spaced aproximately four times as far apart axially as are the exterior grooves.

Figure 3:
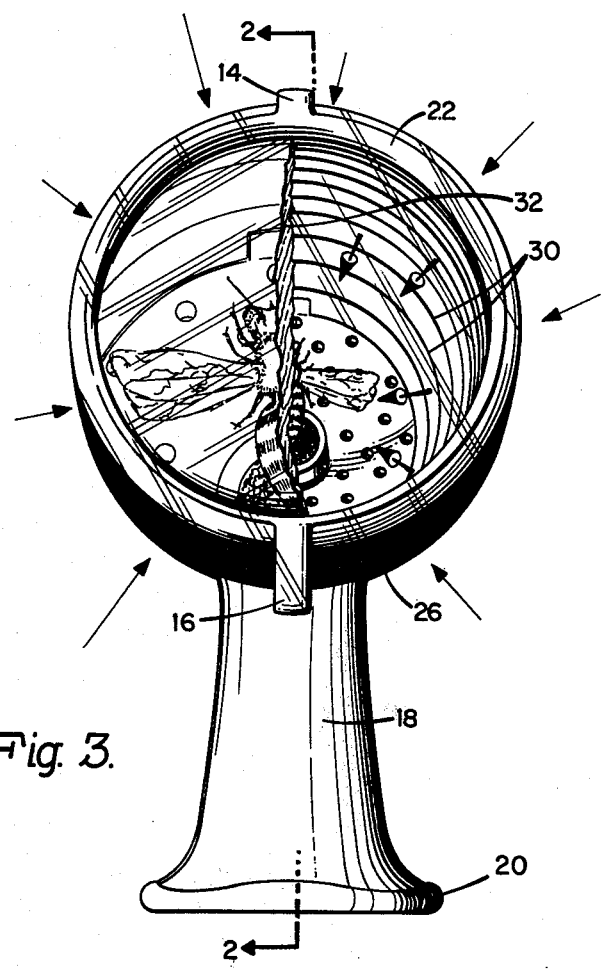
FIG. 3 is a front elevational view of the microscope shown in FIG. 1. A portion of the magnifying lens has been cut away to illustrate the interior grooved lens walls.

The function of the Fresnel grooves is to gather the incident external light rays and to concentrate and focus them towards the viewed end of the lens wall. The arrows in FIG. 3 illustrate this phenomenon.

It will be understood that the preferred embodiment of the Fresnel lens, as just described, may be substantially varied within the scope of this invention. For example, the Fresnel grooves could be formed in the interior or the exterior lens wall surfaces or in both of them. The Fresnel grooves could be a plurality of separate circular grooves or could be a single helical or other screw-like groove (which single groove is included within the definition of a plurality of axially spacedapart grooves, as set forth in the claims). The Fresnel grooves could also be continuous or interrupted. At least a portion of the interior surface of the Fresnel lens wall 12 could be covered with a reflecive (i.e., one way) coating which permits light rays to enter through the lens wall, and which prevents light rays from exiting through the lens wall. The foregoing merely suggests several variations which are feasible.

In order to view the living insects or other specimens, a magnifying lens 32 is mounted in a groove in the viewing end of the tubular lens wall 12. Magnifying lens 32 is preferably circular is shape and convex on both sides. It can be injection molded from scratch-resistant styrene and is protected from scratching during use by the protective rim 22. A 2.5 power lens which produces up to a 6.25 area magnification has proved suitable in use. The magnifying lens 32 is focused on a focal point 34 located slightly beyond the viewed end on axis 28 so that the magnifying lens cannot accidentally melt the bottom wall or door 36.

The magnifying lens closes the viewing end of lens wall 12 and is co-axial with relation to axis 28. One magnifying lens is usually sufficient, but special requirements may necessitate the use of multiple lenses.

In order to close the viewed end of lens wall 12, a bottom wall or door 36 is provided. Preferably, bottom wall 36 is hinged to pedestal 18 (as shown in FIGS. 1 and 2) and can be manually pivoted between an open position (FIG. 1) and a closed position (FIG. 2). If desired, the hinged arrangement can be modified to permit bottom wall 36 to pivot all the way down against the pedestal in order to completely clear the area around the viewed end of lens wall 12. In this latter arrangement, the microscope 10 can be placed over an object which rests on a horizontal surface and the object can be directly illuminated by the Fresnel grooves and directly viewed through the magnifying lens. Objects such as flowers and rocks can advantageously be viewed in this manner.

Of course, the principal mode of use involves the opening of bottom wall 36, the inserting of a living insect or the like into the interior of lens wall 12, and the closing of bottom wall 36. The bottom wall has a protruding tab 38 which frictionally engages with the upper notch in seat 24 in order to securely hold the bottom wall 36 in the closed position.

Bottom wall 36 is provided with a plurality of ventilation apertures 40 and a passageway 42 which holds an interiorly located, removable sponge 44. The purpose of the sponge is to hold a water supply for the contained insects. By dipping bottom wall 36 into water, the sponge 44 will absorb sufficient water to provide aproximately one day's supply, usually.

To use the microscope of this invention, the viewer places insects or the like into the hollow tubular lens wall 12 and closes the bottom wall 36. The exterior light is refracted by the exterior and interior Fresnel grooves and is directed towards the insects at the viewed end. Preferably, the interior surfaces of the bottom wall are frosted or are painted with a semi-gloss, light colored coating, and the cumulative effect of the grooves and coating is usually a 300% enhancement in the light intensity level on the insects. The viewer observes the insects through the magnifying lens. FIG. 3 shows an example of the resulting magnified view of a typical insect. Even though the insects move around, they can be easily observed through the magnifying lens.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:
1. A microscope comprising:
   (a) a hollow, tubular Fresnel lens having a viewing end, a viewed end, and a tubular light-transmitting lens wall, at least one surface of said tubular lens wall having a plurality of axially spaced-apart, circular Fresnel grooves cut therein:
      (i) said Fresnel grooves being sawtooth-shaped in cross-section;
      (ii) said Fresnel grooves having circumferentially circular groove bottoms, said circular bottoms being co-axial and lying in substantially parallel planes which planes are substantially perpendicular to the lens wall axis;
      (iii) the diameters of said Fresnel groove bottoms being substantially nonincreasing in the direction of said viewed end;
      (iv) said Fresnel grooves refracting incident external light rays generally towards said viewed end;
   (b) a magnifying lens mounted in co-axial relation to said Fresnel lens wall axis, said magnifying lens being substantially focused on said viewed end; and
   (c) a bottom wall affixed to and closing the viewed end of said Fresnel lens wall.

2. The microscope of claim 1 wherein said at least one wall surface containing said Fresnel grooves includes the exterior wall surface.

3. The microscope of claim 1 wherein said at least one lens wall surface containing said Fresnel grooves includes the interior wall surface.

4. The microscope of claim 1 wherein said at least one lens wall surface containing said Fresnel grooves includes both the exterior and the interior wall surfaces.

5. The microscope of claim 1 wherein said magnifying lens is mounted in said Fresnel lens wall.

6. The microscope of claim 5 wherein said magnifying lens is mounted at the viewing end of said Fresnel lens wall.

7. The microscope of claim 6 wherein said magnifying lens closes the viewing end of said Fresnel lens wall.

8. The microscope of claim 1 wherein said bottom wall is removably affixed to the viewed end of said Fresnel lens wall.

9. The microscope of claim 8 wherein said removable bottom wall is pivotally affixed to the viewed end of said Fresnel lens wall.

10. The microscope of claim 1 wherein said bottom wall is provided with a plurality of ventilation apertures.

11. The microscope of claim 1 wherein said bottom wall is provided with a sponge opening, and a sponge is affixed therein.

12. The microscope of claim 1 wherein at least a portion of the interior surface of said Fresnel lens wall is covered with a reflective coating which permits light rays to enter through said wall and which prevents light rays from exiting.

13. The microscope of claim 1 further having a pedestal affixed to and supporting said Fresnel lens wall.

14. The microscope of claim 13 wherein said pedestal has the configuration of a hand grip.

15. The microscope of claim 1 wherein said Fresnel lens wall are made of substantially transparent rigid plastic material.

* * * * *